United States Patent
Dillon, Jr. et al.

[11] 3,811,096
[45] May 14, 1974

[54] MAGNETO-OPTIC MODULATORS

[75] Inventors: Joseph Francis Dillon, Jr.; Legrand Gerard Van Uitert, both of Morristown; Stuart Harry Wemple, Chatham, all of N.J.

[73] Assignee: Bell Telephone Laboratories, Incorporated, Murray Hill, N.J.

[22] Filed: Sept. 21, 1972

[21] Appl. No.: 290,786

[52] U.S. Cl............ 332/7.51, 350/151, 331/94.5 M
[51] Int. Cl.............................................. H01s 3/10
[58] Field of Search............ 332/7.51; 331/94.5 M; 350/151, 160

[56] References Cited
UNITED STATES PATENTS
3,459,189  2/1970  LeCraw ........................... 332/7.51

OTHER PUBLICATIONS
Buhrer, "Enhancement of the Faraday Rotation of Trav., and Rare–Earth Ions," 3/1/70, pp. 1393–1394, Jour. App. Phys., Vol. 41, No. 3.

Dillon et al., "Linear Magnetic Birefringense in the Ferrimagnetic Garnets," 10/70, pp. 4613–4619, J. A. P., Vol. 41, No. 11

Primary Examiner—Benjamin A. Borchelt
Assistant Examiner—N. Moskowitz
Attorney, Agent, or Firm—W. L. Keefauver

[57] ABSTRACT

Magneto-optic modulators of the garnet structure useful over a transparency bandwidth of from about 1 to 5 micrometers show improved figure of merit where the dodecahedral site is at least partially occupied by praseodymium or neodymium, remainder gadolinium or europium.

10 Claims, 4 Drawing Figures

| 41 | $Yb_3 Fe_5 O_{12}$ |
| 42 | $Er_3 Fe_5 O_{12}$ |
| 43 | $Y_3 Fe_5 O_{12}$ |
| 44 | $Tb_3 Fe_5 O_{12}$ |
| 45 | $Gd_2 Pr Fe_5 O_{12}$ |
| 46 | $Eu_2 Pr Al_{.5} Fe_{4.5} O_{12}$ |
| 47 | $Eu_2 Pr Sc_{.5} Fe_{4.5} O_{12}$ |
| 48 | $Nd_3 Sc Fe_4 O_{12}$ |

MAGNETO-OPTIC MODULATORS

BACKGROUND OF THE INVENTION

1. Field of the Invention

The invention is concerned with devices utilizing magneto-optic rotation for the modulation of coherent radiation over an approximate wavelength range of from 1 to 5 micrometers.

2. Description of the Prior Art

Contemplated laser systems involving modulation of laser output have over the past several years generally made use of electro-optic interactions. This effect, which is dependent upon induced birefringence resulting from an applied electric field, has been generally considered preferable to competing effects for a variety of reasons. The many electro-optic materials of requisite high crystalline perfection have permitted operation over a very broad wavelength range of laser radiation. Materials are readily prepared, commercially available, etc.

One such competing effect--magneto-optic interaction--while early shown to have the requisite capability of broad bandwidth modulation with small applied power, has received little attention, see U.S. Pat. No. 3,495,189. The best material reported for this type of modulator is gallium substituted YIG ($Y_3Fe_{5-x}Ga_xO_{12}$), and this material, properly oriented, has been utilized for baseband modulation of a bandwidth of 0.2 GHz with a power requirement comparable to that of competing electro-optic modulators. The transparency bandwidth of YIG is primarily within the near infrared spectrum (about 1 to 5 micrometers), and materials of comparable effectiveness with transparency bandwidths throughout the visible spectrum have not emerged. YIG has, however, always been considered a contender for modulation of laser radiation in its transparency bandwidth. A prime example is in systems utilizing neodymium-YAG lasers with output radiation wavelength of about 1.06 micrometers.

Recent interest in miniaturized laser apparatus has tended to rekindle interest in magneto-optic modulation. A very promising package now under development utilizes a small Nd-YAG laser crystal optically pumped by an LED (light-emitting diode). Such diodes, primarily gallium-arsenide, sometimes containing small amounts of aluminum or other ingredient to alter the emission peak of the LED, have outputs which are well matched to the absorption spectrum of the laser.

YIG modulators may show no significant improvement in modulation per unit of insertion loss as compared with the best electro-optic modulators. Resurgence of interest is largely concerned with the fact the modulation per unit length is increased.

For the reasons outlined, studies are under way to optimize the modulation parameters of garnet modulators.

SUMMARY OF THE INVENTION

Garnet crystals of the stoichiometric composition $A_3B_5O_{12}$ in which A is at least 30 percent neodymium and/or praseodymium, remainder gadolinium or europium, show significant improvement both in modulation per unit length and in insertion loss as compared with YIG. Praseodymium or neodymium content may reach a maximum where B, primarily iron, also contains scandium. Other compositional variation, e.g., gallium and/or aluminum, inclusion in B to decrease saturation magnetization (and therefore magnitude of applied field) are contemplated.

DETAILED DESCRIPTION

1. Composition

Figure 1:
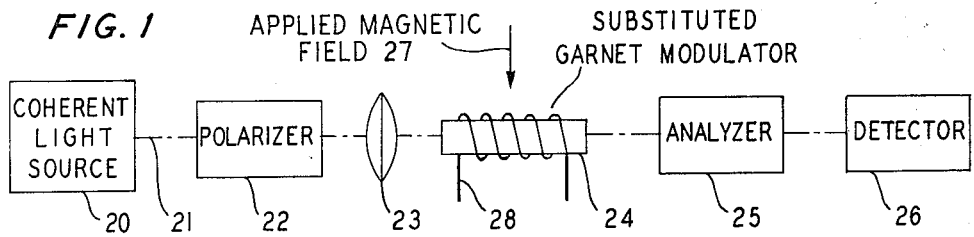
FIG. 1 is a schematic view of a modulator in accordance with the invention.

In common with the usual iron-containing garnet, composition may be represented by the formula $A_3B_5O_{12}$. A sites occupied by yttrium in the prototypical composition $Y_3Fe_5O_{12}$ are crystallographically dodecahedral. Of the B sites, two are octahedral and three are tetrahedral. Except for usual impurities and/or vacancies, the last site in compositions of the invention is occupied by oxygen.

The inventive compositions are dependent upon the presence of praseodymium and/or neodymium with any remainder gadolinium and/or europium in the dodecahedral site. The amount of praseodymium and/or neodymium is specified as being of a minimum of at least 33 ⅓ atom percent (1.0 atom per formula unit) of the A atoms, it being observed that lesser amount, while showing some improvement over YIG for the purposes outlined, shows inferior properties in rotation per unit length. Maximum content of praseodymium and/or neodymium is limited only by the ability to form the garnet phase since device parameters improve with increasing content of either element. In general, where B is iron or iron diluted with aluminum and/or gallium, the upper limit on praseodymium and/or neodymium is approximately 2.5 atom per formula unit. Other substitutions in B may permit formation of pure praseodymium and/or neodymium garnet phase. If the dodecahedral sites are not completely occupied by praseodymium or neodymium, it is a requirement of the invention that remaining material be gadolinium and/or europium. Use of either of these latter elements assures low insertion loss and high rotation per unit length.

It is well known that garnet compositions intended for use in magneto-optic modulators may contain gallium and/or aluminum diluent in the B sites. Such elements, which preferentially occupy tetrahedral sites, decrease the net ferrimagnetic moment. Permitted gallium or aluminum content is set at such quantity as results in a reduced saturation magnetization relative to total B site iron occupancy. Preferred maxiumum gallium and aluminum content is 1.2 atoms of gallium and 1.3 atoms of aluminum with a maximum for a mixture of gallium and aluminum lying between these two values and being linearly related to such content. The two maximum inclusions noted result in approximately equal saturation magnetization at usual temperatures of operation with the lower gallium maximum being explained by the greater preference of gallium for the tetrahedral site.

It has been noted that pure garnet phase with sole praseodymium and/or neodymium A site occupancy is not ordinarily attainable either with pure iron, or gallium and/or aluminum-diluted iron B site occupancy. Substitution of scandium permits attainment of higher praseodymium and/or neodymium content. It has been observed that pure praseodymium and/or neodymium garnets may be produced by utilizing 1.5 atoms or less of scandium in the B sites. Since, however, scandium preferentially occupies octahedral sites, the initial effect is to increase moment and thereby require a larger applied field. Since the latter effect is not desired the preferred maximum scandium content is accordingly set at about 0.5 atom per formula unit, this being found adequate to introduce sufficient Pr or Nd to obtain a peak value in the figure of merit.

In many device applications, it is desirable to reduce the moment. This is accomplished by the use of gallium or aluminum which enter tetrahedral sites. Suitable moment are obtained over a broad range of additions; however, higher Curie temperature materials result when the additions are limited to the preferred ranges of 0.3 to 0.8 and 0.3 to 0.9 units of Ga or Al, respectively, per formula unit as described below.

By virtue of the above considerations, compositions of the invention may be expressed as $A'_x A''_{3-x} B'_y B''_z Fe_{5-y-z} O_{12}$ where $A'$ is praseodymium or neodymium, $A''$ is gadolinium and/or europium, $B'$ is gallium and/or aluminum, $B''$ is scandium, $x$ is from 1 to 3 with a preferred range of 1.5 to 3, $y$ is from 0 to 1.2 with a preferred range from 0.3 to 0.8 where $B'$ is gallium and from 0 to 1.3 with a preferred range from 0.3 to 0.9 where $B'$ is aluminum, $z$ is from 0 to 0.75 with a preferred range of from 0 to 0.5.

The compositional considerations set forth above are optimum for the inventive purposes. Inclusion of other atoms, particularly in the A sites, is generally harmful. While modifications of this type, for example, inclusion of small amounts of yttrium, are certainly deleterious they nevertheless show some improvement over YIG either unmodified or aluminum/gallium diluted. While either praseodymium or neodymium incorporated in accordance with the considerations above result in a higher specific rotation and in lower insertion loss, a preference exists for praseodymium. This preference is based on the lowered magnetocrystalline anisotropy which lessens the energy hump between the minimal and maximum modulation directions in a typical modulator design. Such lowered anisotropy permits use of a smaller d.c. field (corresponding with the highest saturating value during device operation).

2. Material Preparation

Optical perfection implied by the described uses suggests a single crystalline material. Compositions of the invention may be prepared by techniques found suitable for the growth of other iron-containing garnets. Since such materials are not congruently melting, melt growth techniques may not be used. In general, crystals are produced from flux solution, the most popular fluxes containing either PbO or $Bi_2O_3$. PbO fluxes are ordinarily modified by inclusion of $B_2O_3$ and/or $PbF_2$ (see Vol. 48 Journal of the American Ceramic Society, No. 2, February 1965 page 105). Flux growth may take the form of seeded or randomly nucleated growth.

Various types of epitaxial growth have been developed to meet the demanding requirements of bubble device technology. Any of these techniques which are applicable to integrated optics and to miniaturization in general may be utilized. Such techniques, which generally involve a closely matched substrate, for example, of a rare earth aluminum or gallium garnet, may involve liquid phase epitaxy wherein a substrate is immersed in a solution of the crystal components in the $PbO-B_2O_3$ flux (see, for example Vol. 42 Journal of Applied Physics, page 1554 (1971). An alternative procedure depending upon isothermal growth from a supersaturated solution has been found to yield high perfection fields. See, for example, Vol. 19, No. 11, Applied Physics Letters, page 486 (1971).

Detailed growth conditions are familiar to most workers and are not repeated here. Growth conditions found useful for bulk growth are set forth in Example 1.

In the $PbO-PbF_2-B_2O_3$ flux, the addition of divalent cations supresses the inclusion of $Fe^{2+}$ in the crystal. The presence of $F^-$ in the flux suppresses the inclusion of $Fe^{4+}$. These two species of iron are generally considered to be sources of absorption losses, for example, at 1.06 micrometer wavelength. $Ca^{2+}$ has been found to be one of the more suitable divalent ions for the suppression of $Fe^{2+}$ and is best incorporated in small amounts resulting from the addition to one-tenth to one-half weight percent of the crystal components as CaO or its equivalent.

In the absence of $F^-$ in the flux, $Si^{4+}$ additions can be used to minimize the presence of $Fe^{4+}$.

3. The Figures

The device of FIG. 1 follows a prototype described by R. C. LeCraw (see, for example, U.S. Pat. No. 3,495,189). The described device represents a fairly high level of development in, for example, taking into account magnetocrystalline anisotropy and choosing directions such as to minimize the energy required for changing the angle of the magnetic field relative to the transmission direction. While described largely in terms of analog modulation, it may be adapted to PCM or other pulse modulation. It is exemplary of a family of devices which may involve reflected traversal through the modulator and other design changes for optimizing operation under particular operating conditions.

The apparatus of FIG. 1 consists of laser coherent light source 20 producing light beam 21, which passes through plane polarizer 22, focusing means 23, substituted iron garnet modulator 24, analyzer 25, and finally into detector 26, in succession. An applied field 27 having a component normal to the light transmission direction maintains modulator 24 magnetically saturated. Modulating current, introduced through winding 28, results in rotation of the plane polarized light beam to a degree dependent upon the magnitude of the component of magnetization lying in the transmission direction. In common with other modulation apparatus, the relative polarization directions of elements 22 and 25 depend upon the desired mode of operation. They may be crossed so as to permit no transmission in the absence of modulating current, or they may be parallel to permit maximum transmission in the absence of modulating current. They may be at some intermediate angle for biased linear CW operation or for one mode of digital operation, which, while resulting in some loss, may take advantage of rotation of less than 90°.

Figure 2:
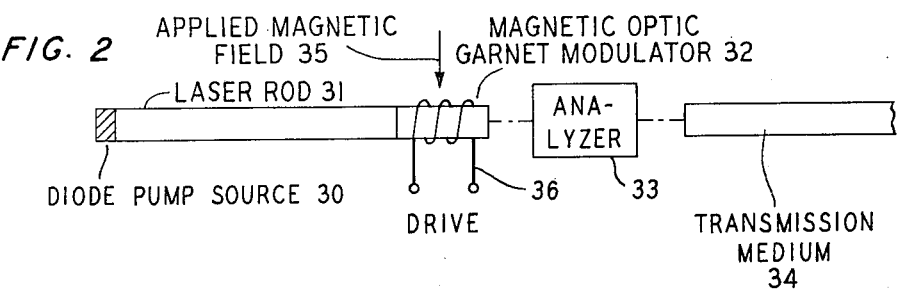
FIG. 2 is a front elevational view of laser package including a modulator of the invention.

The apparatus of FIG. 2 involves a light-emitting diode 30 serving as a diode pump source for laser rod 31 together with a magneto-optic garnet modulator 32 and analyzer 33. A transmission medium 34 is also shown. The diode pump source may be a gallium arsenide diode, forward biased by d.c. source not shown. Laser rod 31 may be a miniature version of the conventional Nd-YAG laser in which event it may be desirable to modify the emission peak of diode pump source 30, for example, in the instance of a GaAs diode, by aluminum inclusion, to approximate the laser absorption peak. The interface between laser 31 and diode pump source 30 is mirrored so as to be completely reflecting with respect to laser radiation while that between laser rod 31 and modulator 32 is partially mirrored to permit transmission. Modulator 32, which in principle is no different from element 24 of FIG. 1, is provided with a magnetizing means, 35, generally a fixed field of sufficient magnitude to saturate the garnet material of which modulator 32 is constructed, and modulating or drive means 36 for tilting the resolved field so as to vary the component in the light transmission direction. Analyzer 33, which includes a polarizing medium, directly converts rotational modulation into amplitude modulation. The so modulated beam may so be introduced into transmission medium 34.

Figure 3:
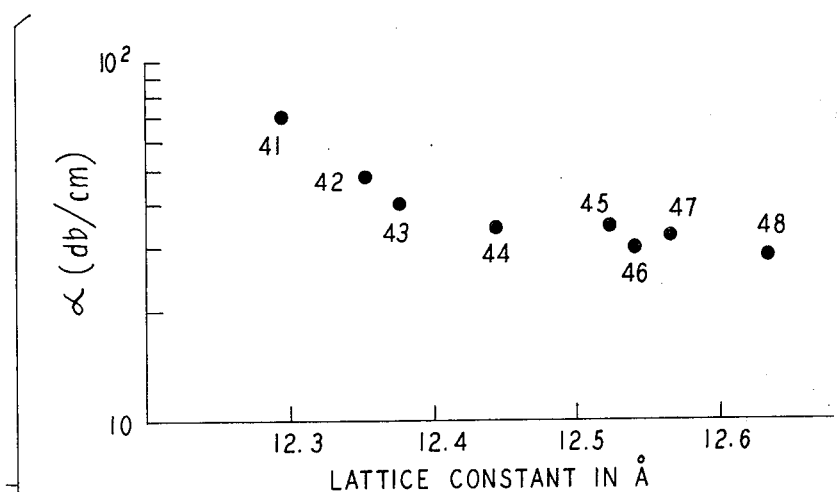
FIG. 3, on coordinates of insertion loss on the ordinate and lattice constant on the abscissa, is a graph showing data points for a variety of designated compositions interrelating these two parameters.
Figure 4:
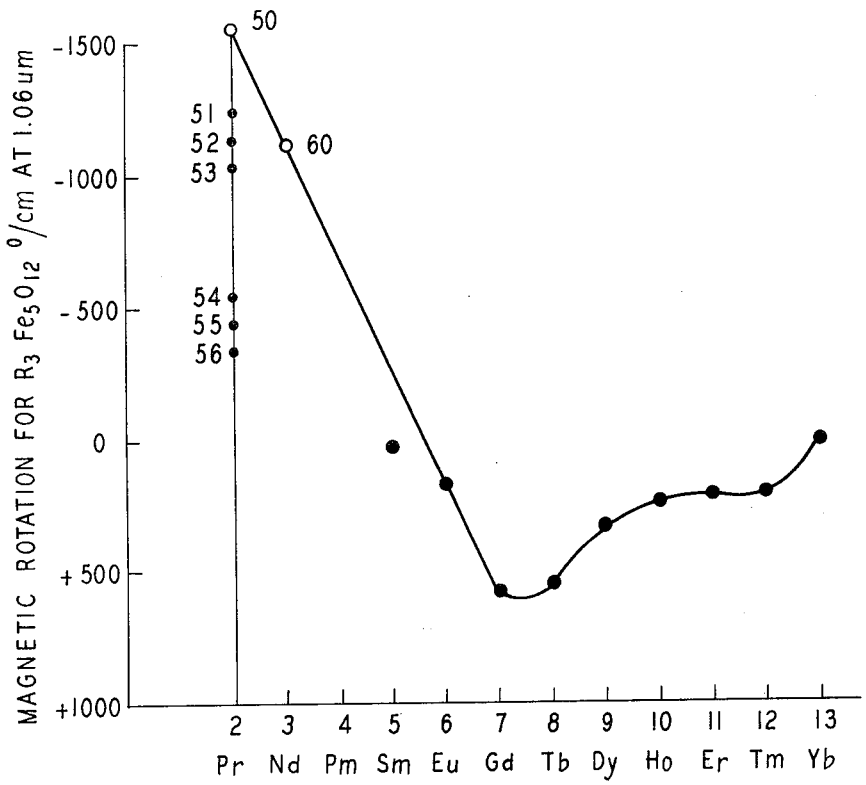
FIG. 4, on coordinates of magnetic rotation on the ordinate and increasing atomic number or numbers of electrons in the 4f-shell on the abscissa is a plot interrelating these two parameters for a variety of garnet compositions.

FIGS. 3 and 4 include plotted data corresponding primarily with experimentally determined information (solid points) but include some extrapolated infomation (unfilled circles).

FIG. 3, on coordinates of insertion loss in dB per centimeter ($\alpha$) at a wavelength of 1.06 micrometers, and crystalline lattice constant in angstrom units, has 8 measured data points set forth. Such points, numbered 41 through 48 inclusive, correspond with similarly numbered garnet compositions tabulated on the figure. The choice of the particular abscissa units shown is suggestive of applicants' theoretical explanation for the improved results realized. From this and other data, it has been observed that there is a reasonable correlation between insertion loss and lattice constant with loss decreasing as lattice constant increases.

FIG. 4 is on coordinates of rotation for degrees per centimeter at a wavelength of 1.06 micrometers and the 4$f$ rare earth progression from elements of atomic numbers 59 through 70. Points 50 and 60 are extrapolated values deduced from series of samples of which one series is tabulated. The series tabulated is a progression of praseodymium-containing compositions. Such compositions, numbered 51 through 56, result in data points which are similarly numbered. It is seen that the compounds with the greater amount of praseodymium evidence the higher specific rotation. The measured data points corresponding with the rare earths, samarium through ytterbium, are included primarily for purposes of comparison. While examination of these data alone would suggest the desirability of utilizing terbium garnets, this material has sufficiently high insertion loss and magneto-crystalline anisotropy to disqualify it for most uses.

EXAMPLE 1

Crystals having the compositions $GdPr_2 Fe_5 O_{12}:Ca$ were prepared by growth from a flux. A typical procedure follows: A mixture of:

| Crystal Components | | and | Flux Components | |
|---|---|---|---|---|
| $Gd_2O_3$ | 21.8 g. | | PbO | 125 g. |
| $Pr_2O_3$ | 57.6 g. | | $PbF_2$ | 152 g. |
| $Fe_2O_3$ | 57.6 g. | | $B_2O_3$ | 7 g. |
| | | | CaO | 0.3 g. | were melted together in a 100 ml platinum crucible, covered with a platinum lid and placed in a muffle furnace that was subsequently raised in temperature to 1,300° C and then slowly cooled to 950° C at a rate of about ½° C per hour. At 950° C the flux was poured off leaving a cluster of crystals that ranged up to 2 cm on a side. Faraday rotation $\Phi \approx -1,000$ deg/cm and loss, $\alpha$ at 1.06 $\approx$ 30 dB/cm with a Figure of merit of 37 deg/dB.

Device parameters were determined on test apparatus similar to that depicted in FIG. 1. The modulator crystal was cut and polished to a rod configuration of approximately ½ mm diameter and one cm in length, with the length dimension corresponding with a [100] crystallographic direction. A d.c. magnetic field such as that designated 27 in FIG. 1 was applied in a [110] direction, the saturating field magnitude being of the order of 200 oersteds. Field was applied in such manner that the plane defined by this field and the light traversal direction (the length direction) included a [111] direction. A modulating field of maximum value of about 2 oersteds was produced by passing current through an encircling coil, such as 28 of FIG. 2. Plane polarized light of wavelength equal to 1.06 μm from a Nd-YAG laser was introduced into the modulator, the output was passed through an analyzer and the resulting variation in amplitude was measured in a photovoltaic detector. On the basis of this experiment, rotation and insertion loss values were determined. Figure of merit, as discussed in the following section, was calculated to be 37° per dB.

For comparison, the data of examples 2 through 6 were carried out utilizing compositions prepared in the same manner and on apparatus constructed and operated as described in example 1.

EXAMPLE 2

Crystals having the compositions $Gd Pr_2 Al_{.5}Fe_{4.5}O_{12}:Ca$ were prepared as above from a mixture of:

| Crystal components | | and | Flux Components | |
|---|---|---|---|---|
| $Gd_2O_3$ | 21.7 g. | | PbO | 124 g |
| $Pr_2O_3$ | 39.6 g. | | $PbF_2$ | 152 g. |
| $Fe_2O_3$ | 51.8 g. | | $B_2O_3$ | 7 g. |
| $Al_2O_3$ | 3.7 g. | | CaO | 0.2 g. |

$\Phi \approx -800$ deg/cm, $\alpha \approx 30$ dB/cm, Figure of merit $\sim 27$ deg/dB

Example 3

Crystals having the composition $Eu Pr_2 Ga_{.5} Fe_{4.5} O_{12}:Ca$ were prepared as above from a mixture of:

| Crystal Components | | and | Flux Components | |
|---|---|---|---|---|
| $Eu_2O_3$ | 21.1 g. | | PbO | 125 g. |
| $Pr_2O_3$ | 39.6 g. | | $PbF_2$ | 123 g. |
| $Fe_2O_3$ | 51.8 g. | | $B_2O_3$ | 7 g. |
| $Ga_2O_3$ | 6.8 g. | | CaO | 0.2 g. |

$\Phi \approx -700$ deg/cm, $\alpha \approx 25$ dB/cm, Figure of merit $\sim 40$ deg/dB

EXAMPLE 4

Crystals having the compositions $Gd\, Pr_2\, Sc_{.5}\, Fe_{4.5}\, O_{12}$:Ca were prepared as above from a mixture of:

| Crystal Components | | and | Flux Components | |
|---|---|---|---|---|
| $Gd_2O_3$ | 21.8 g. | | PbO | 125 g. |
| $Pr_2O_3$ | 39.6 g. | | $PbF_2$ | 152 g. |
| $Fe_2O_3$ | 51.8 g. | | $B_2O_3$ | 7 g. |
| $Sc_2O_3$ | 5.0 g. | | CaO | 0.3 g. |

$\Phi \approx -1{,}200$ deg/cm, $\alpha \approx 30$ dB/cm, Figure of merit $\sim 40$ deg/dB.

EXAMPLE 5

Crystals having the composition $Gd\, Nd_2\, Sc_{.5}\, Fe_{4.5}\, O_{12}$:Ca were prepared as above from a mixture of:

| Crystal Components | | and | Flux Components | |
|---|---|---|---|---|
| $Gd_2O_3$ | 21.8 g. | | PbO | 125 g. |
| $Nd_2O_3$ | 40.5 g. | | $PbF_2$ | 152 g. |
| $Fe_2O_3$ | 51.8 g. | | $B_2O_3$ | 7 g. |
| $Sc_2O_3$ | 5.0 g. | | CaO | 0.3 g. |

$\Phi \approx -900$ deg/cm, $\alpha \approx 30$ dB/cm, Figure of merit $\sim 30$ deg/dB

EXAMPLE 6

Crystals having the composition $Pr_3Sc\, Fe_4\, O_{12}$:Ca were prepared as above from a mixture of:

| Crystal Components | | and | Flux Components | |
|---|---|---|---|---|
| $Pr_2O_3$ | 59.4 g. | | PbO | 123 g. |
| $Fe_2O_3$ | 46.1 g. | | $PbF_2$ | 150 g. |
| $Sc_2O_3$ | 10 g. | | $B_2O_3$ | 7 g. |
| | | | CaO | 0.3 g. |

$\Phi \approx -1{,}000$ deg/cm, $\alpha \approx 25$ dB/cm, Figure of merit $\approx 40$ deg/dB. $\Phi$ was lower than expected from the presence of 3 pr ions due to a low Curie temperature.

5. Design Considerations

Degree of magneto-optic rotation, sometimes referred to as "Faraday" rotation, is optimized as a resonance absorption peak is approached. Selection of a composition for a particular device is strongly frequency dependent with the precise composition selected representing a compromise between the increasing magnitude of rotation and increasing magnitude of insertion loss, both of which result as operation approaches resonance. Materials of the invention are most generally useful over the approximate wavelength range of from 1 to 2 micrometers. Compositions have been chosen, however, with a particular view to utilization with 1.06 micrometer radiation, and operation is desirably from about 1 to about 1.5 micrometers. A useful quantity in evaluating an optical modulator is given by the reactive drive power $\phi$ per cycle of bandwidth $\Delta f$. This quantity is related to material properties by the relation $\phi/\Delta f \sim VM^2/\chi m$, where it has been assumed, for clarity, that the magnetic susceptibility $\chi m$ is independent of applied magnetic field (linear approximation), V is the volume of the crystal, and M is the magnetization. The susceptibility is related to such factors as the crystal cut, demagnetizing fields, and magneto-crystalline anisotropy values which are engineering considerations essentially independent of the composition of the invention. Reduction in saturation magnetization results from dilution of tetrahedral iron, for example, by gallium or aluminum as discussed. The primary interest, in accordance with the invention, is the modulator volume, V. This volume is minimized by use of praseodymium or neodymium and in accordance with the other compositional considerations set forth.

Reduction of crystal volume is, in part, accomplished by reducing the cross-sectional area, A, to the greatest possible extent. Factors of concern include demagnetizing field magnitude, impedance matching with the laser and/or transmission media, and fabrication considerations. The quantity of primary concern in connection with the invention is the modulator length, $l$.

Because the total absorption loss, L, is given by $\alpha l$ and the total excursion of the optical rotation $\theta$ is given approximately by $\Phi l$, $L(dB) = (\alpha/\Phi)\theta$. For $\theta$ equals 90° (corresponding with 100 percent amplitude modulation) and $L \leq 6$ dB, it is necessary that $\Phi/\alpha \geq 15°$/dB.

It is generally believed that such large specific rotations per unit loss can only be achieved at wavelengths longer than that of the band edge where $\alpha$ is relatively small. In this respect, the materials utilized in accordance with the invention owe part of their advantage, with respect to YIG, to a shift in band edge to higher energy. The evidence presented is consistent with the premise that the shift in band edge accompanies increasing lattice constant as shown in FIG. 3.

For radiation of the wavelength range contemplated, insertion loss, $\alpha$, is also decreased for such shift with the correlation here being seen for increasing atom number (see FIG. 4).

What is claimed is:

1. Apparatus including an magnetooptic modulator, comprising a single crystal of an iron-containing ferrimagnetic garnet composition of the approximate stoichiometry $A_3B_5O_{12}$ transparent to electromagnetic radiation of an approximate bandwidth range of from 1 to 5 micrometers, first means for introducing coherent electromagnetic radiation within such bandwidth into said modulator, second means for extracting such radiation, third means for applying a magnetic field at least sufficient to magnetically saturate the said crystal, the said field having a component orthogonal to the transmission direction of the said radiation, and fourth means for changing the angle of the applied saturated field relative to the said transmission direction, characterized in that the composition consists essentially of said garnet composition approximately represented by the atom formula $A'_xA''_{3-x}B'_yB''_zFe_{5-y-z}O_{12}$ in which $A'$ is praseodymium and/or neodymium, $A''$ is gadolinium and/or europium, $B'$ is gallium and/or aluminum, $B''$ is scandium, $x$ is from 1 to 3, $y$ is from 0 to 1.2 where B' is gallium and from 0 to 1.3 where B' is aluminum, and $z$ is from 0 to 0.75.

2. Apparatus of claim 1 in which the A' atom consists essentially of praseodymium in the range $x = 1.5$ to 3.0.

3. Apparatus of claim 2 in which the B' atom is aluminum in the range $y = 0.3$ to 0.9 or gallium in the range $y = 0.3$ to 0.8.

4. Apparatus of claim 1 in which $z$ is from 0 to 0.5.

5. Apparatus of claim 1 in which the first means for introducing radiation includes an optically polished surface.

6. Apparatus of claim 1 in which the said first means includes a neodymium/YAG laser provided with optical pump means.

7. Apparatus of claim 6 in which the said optical pump means includes a light-emitting diode.

8. Apparatus of claim 7 in which the said light-emitting diode is a gallium arsenide junction diode.

9. Apparatus of claim 8 in which the gallium arsenide diode is modified by aluminum inclusion to change its peak emission wavelength.

10. Apparatus of claim 8 in which the light-emitting diode is in solid contact with the laser.

* * * * *

UNITED STATES PATENT OFFICE
CERTIFICATE OF CORRECTION

Patent No. 3,811,096         Dated May 14, 1974

Inventor(s) Joseph F. Dillon, Jr., LeGrand G. Van Uitert, and Stuart H. Wemple

It is certified that error appears in the above-identified patent and that said Letters Patent are hereby corrected as shown below:

Column 1, line 52, "with the fact the" should read --with the fact that--.

Column 5, line 67, "disquality" should read --disqualify--.

At the top of column 6, before "EXAMPLE 1" there should be a heading, even with the left margin, reading:

--4. Examples--.

Signed and sealed this 24th day of September 1974.

(SEAL)
Attest:

McCOY M. GIBSON JR.
Attesting Officer

C. MARSHALL DANN
Commissioner of Patents